March 27, 1928.  
E. W. GREEN  
1,663,651  
DEVICE FOR SEPARATING LIQUIDS OF DIFFERENT SPECIFIC GRAVITIES  
Filed June 8, 1926  
2 Sheets-Sheet 1
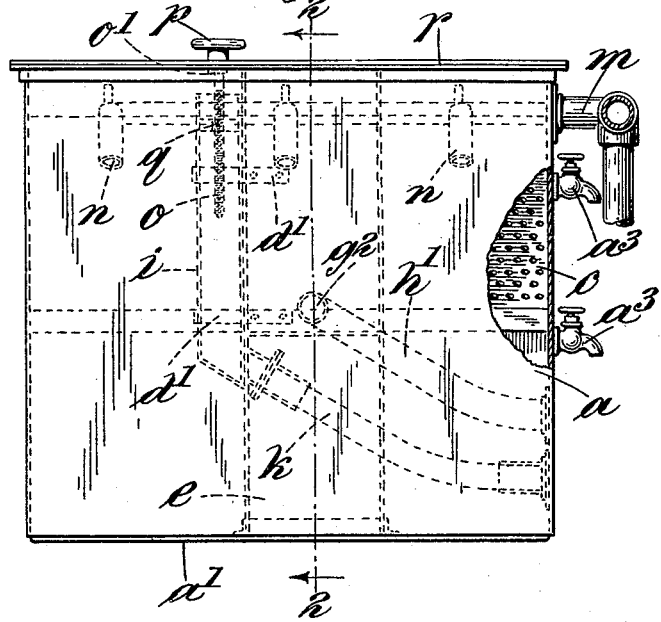
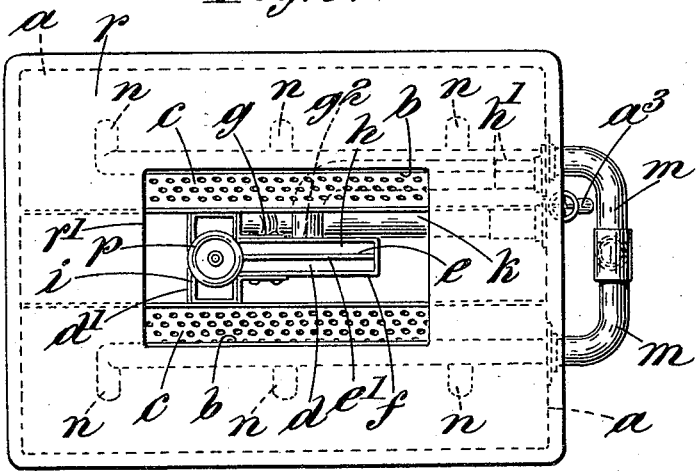
Inventor,  
Edward William Green March 27, 1928.
E. W. GREEN
1,663,651
DEVICE FOR SEPARATING LIQUIDS OF DIFFERENT SPECIFIC GRAVITIES
Filed June 8, 1926   2 Sheets-Sheet 2
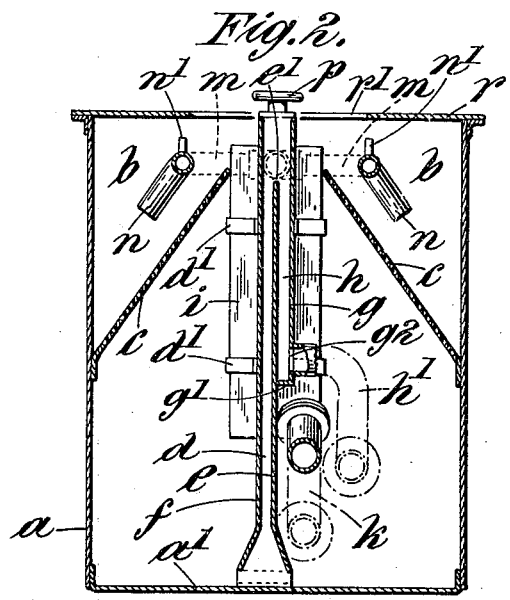
Edward William Green
Inventor Patented Mar. 27, 1928.

1,663,651

UNITED STATES PATENT OFFICE.

EDWARD WILLIAM GREEN, OF LONDON, ENGLAND.

DEVICE FOR SEPARATING LIQUIDS OF DIFFERENT SPECIFIC GRAVITIES.

Application filed June 8, 1926, Serial No. 114,422, and in Great Britain June 24, 1925.

This invention relates to an improved device for separating liquids of different specific gravities and has for its object the provision of means whereby the separated liquids can be delivered from separate conduits in a simple although nonautomatic manner.

This invention consists of an improved device for separating liquids of different specific gravities comprising a tank for collecting the separated liquids into strata; means for introducing the admixed liquids into the liquids in the tank at a low velocity and without shock; means for automatically delivering the lower part of the liquid of heavier specific gravity to the exterior of the apparatus after a predetermined volume has accumulated in said tank and means whereby the stratum of liquid of lighter specific gravity can be withdrawn from the surface of the liquid of heavier specific gravity as and when required.

In the drawings:—

Fig. 1 is a side elevation of one form of separator constructed in accordance with this invention.

Fig. 2 is a sectional end elevation of Fig. 1 taken on the line 2—2 of that figure and looking in the direction of the arrow.

Fig. 3 is a plan view of the separator illustrated in Figs. 1 and 2.

Referring to Figures 1, 2 and 3 of the drawings which illustrate a separator particularly suited for dealing with bilge water $a$ is a tank of suitable size and convenient shape; in the upper part of the tank $a$ two channels $b\ b$ are formed by the sloping partitions $c\ c$ which are perforated, said perforations being of such size and arrangement as will allow the bilge water or the constituent parts thereof to pass therethrough at the requisite rate.

A vertical trunk $d$ is formed of two side walls $e$ and $f$ and two end walls and is supported with its lower end a short distance above the floor $a'$ of the tank $a$; in some cases the lower parts of the walls $e$ and $f$ may be angularly disposed so as to form a flared inlet if necessary.

The side wall $f$ is continued up to the top of the tank $a$ but the wall $e$ is terminated somewhat below this level as its upper edge $e'$ is to act as a weir over which the separated water is to be discharged. In the construction illustrated in Figures 1, 2 and 3, the edge $e'$ is so located that the level of fluid in the tank $a$ is disposed in the channels $b\ b$.

In order to collect the separated water discharged over the edge $e'$ and convey it out of the tank $a$ without contamination the trunk $d$ is provided with a third side wall $g$, bottom $g'$ and the necessary end walls to form a chamber $h$, said side wall $g$ having an aperture $g^2$ and conduit $h'$ which latter communicates to the exterior of the tank $a$.

In proximity with the trunk $d$ a displaceable trunk $i$ is arranged the lower part of said trunk $i$ having a flexible conduit $k$ connected thereto and arranged so as to deliver the collected oil from the trunk $i$ to the exterior of the tank $a$.

To enable the trunk $i$ to be moved upwards and downwards so that its upper edge $i'$ shall be suitably located relative to the surface of the oil stratum a screw $o$ having a hand wheel $p$ is provided. The screw $o$ is journalled in a bracket $o'$ mounted on the fixed structure of the tank $a$ and engages with a nut or screwed housing $q$ mounted on the trunk $i$.

The trunk $i$ is guided to move in a vertical direction by the bands $d'$ which are carried on the structure of the trunk $d$.

The bilge water to be separated is supplied through the pipe $l$, bends $m\ m$ and nozzles $n\ n$ air vents $n'\ n'$ being provided to prevent syphoning back under any conditions.

As separators for handling bilge water are invariably mounted on ships or other floating structures during use care has to be taken to avoid any material disturbance in the integrity of functioning due to the rolling and pitching of the ship or the like and to restrain the free motion of the surface of the fluid.

In the construction illustrated in Figures 1, 2 and 3 of the drawings it will be noted that the upper edge $i'$ of the trunk $i$ and the edge $e'$ of the wall $e$ are arranged as near to the geometrical centre of the tank $a$ as possible and a cover $r$ having an aperture $r'$ is provided on the tank $a$.

In operation, assuming the tank $a$ is full of water, the bilge water supplied to the pipe $l$ is delivered into the channels $b\ b$ by the nozzles $n\ n$; partial separation of the fluids takes place in the channels $b\ b$ and the water with a small quantity of oil passes downwards through the perforated sloping partitions c c slowly and without shock into the body of the fluid in the tank a, whilst the oil floating on the surface of the fluid in the channels b b with a small quantity of water passes outwards through the perforated sloping partitions c c and forms a layer of oil or unites with a layer of oil already formed the completion of the separation taking place in the tank a.

As bilge water is supplied to the apparatus the separated water from the lower part of the tank a passes upwards through the trunk e and is discharged over the edge e' into the chamber h; from the chamber h the water is conducted to the exterior of the apparatus by the conduit h'.

The displaceable trunk i may be located so that the separated oil continuously flows over its upper edge i' thereby maintaining the thickness of the oil stratum constant or the trunk i may be raised and the oil allowed to accumulate until it is convenient or absolutely necessary to discharge it when the trunk i is lowered, by suitably rotating the hand wheel p, so that oil can flow over the edge i' into the trunk i and from thence to the exterior of the tank a through the conduit k.

Two test cocks $a^3$ may be provided for ascertaining the depth of the oil stratum in the tank a and thereby guide the operator in manipulating the trunk i.

It is convenient when an apparatus of large size is to be employed for handling the oily water of ships in harbours, docks and the like to construct the device as a floating structure.

I claim:—

An improved device for separating liquids of different specific gravities having in combination a tank, perforated distributing troughs or channels for introducing the admixed liquids into the liquids in the tank at a low velocity and without shock, an open ended trunk the lower end of which is in communication with the liquid of heavy specific gravity collected in the lower part of the tank, a partition in said trunk having an upper edge arranged to act as a discharge weir for the liquid of heavy specific gravity, a conduit for conveying the liquid of heavy specific gravity discharged over the weir to the exterior of the tank, a vertically displaceable trunk the upper end of which is arranged to act as a discharge weir for the liquid of lighter specific gravity, a flexible conduit for conveying the liquid of lighter specific gravity from the last named trunk to the exterior of the tank, and mechanical means for raising and lowering the last named trunk relative to the first named trunk, the said trunks being located centrally in said tank so as to reduce effects due to tilting of the tank as much as possible.

EDWARD WILLIAM GREEN.